United States Patent [19]
Noble et al.

[11] Patent Number: 5,926,810
[45] Date of Patent: Jul. 20, 1999

[54] UNIVERSAL SCHEMA SYSTEM

[75] Inventors: Kenton E. Noble, San Mateo; Barry J. Lind, Union City, both of Calif.

[73] Assignee: Oracle Corporation, Redwood Shores, Calif.

[21] Appl. No.: 08/705,739

[22] Filed: Aug. 30, 1996

[51] Int. Cl.[6] .................................................. G06F 17/30
[52] U.S. Cl. ....................... 707/4; 707/2; 707/3; 707/100
[58] Field of Search ................................... 707/1, 100, 2, 707/3, 4

[56] References Cited

U.S. PATENT DOCUMENTS

| | | | |
|---|---|---|---|
| 5,421,012 | 5/1995 | Khoyi et al. ............................. | 395/650 |
| 5,560,005 | 9/1996 | Hoover et al. ............................ | 707/10 |
| 5,596,744 | 1/1997 | Dao et al. ................................ | 707/10 |
| 5,634,053 | 5/1997 | Noble et al. .............................. | 707/4 |

Primary Examiner—Paul V. Kulik
Assistant Examiner—Jean R. Homere
Attorney, Agent, or Firm—Wagner, Murabito & Hao

[57] ABSTRACT

A computer system and method for accessing an altered database architecture using existing code. The present invention transforms information which is stored in a new format in a database such that it appears to existing code to be stored in an old format. In so doing, existing code which was originally designed to access the information stored in the old format is able to access the information stored in the new format. Thus, the present invention allows a user to access information contained within an altered database architecture using existing code.

15 Claims, 13 Drawing Sheets

UNIVERSAL SCHEMA SYSTEM

TECHNICAL FIELD

This invention pertains to relational database systems. Specifically, the present invention pertains to accessing an altered database architecture using existing code.

BACKGROUND ART

In many conventional computer systems, data objects are often stored in a database. The stored data objects may include, for example, data tables. The data tables, in turn, can include information such as employee records, customer information, product inventory records, or countless other types of information. In the example of a data table, the information is typically arranged in columns and rows. For example, an employee record data table might contain a column for the last name of the employee, another column for the first name of an employee, and yet another column for the employee's job title. A separate row of the data table would be used for each employee. When access to information stored in the data table is desired, computer code (e.g. an instruction or set of instructions) is executed to access the desired information. Specifically, the computer code is designed to access the information stored in the data table of the database.

Although such a data accessing method is generally functional, conditions arise which render the method inoperative. More specifically, it is well known that it often becomes necessary to alter or change the architecture of the database. That is, it often becomes necessary to alter or change the format in which information is stored. For example, in the employee record example listed above, it may become necessary to add another column to the data table. The added column might indicate the social security number of the employee. Thus, the format of the information is changed from a three column data table to a four column data table. It will be understood that numerous other types of database format changes may be necessary or desired. Although such a format change seems minor, the existing code was originally designed to access the information stored in the old format. That is, the existing code was designed to access a three column data table, not a four column data table.

In the prior art, in order to accommodate the altered database architecture, the existing code would have to be analyzed and portions of it rewritten. In some instances, as many as tens of millions of lines of existing code would have to be analyzed and some portion thereof rewritten. Analyzing and rewriting the voluminous existing code is a monumental task requiring numerous and costly man-hours or even man-years.

With reference next to Prior Art FIG. 1, a schematic diagram of a prior art database access model is shown. Prior Art FIG. 1 includes an altered database architecture 100, existing code 102, and database interface code 104. In a prior art attempt to solve the problems associated with accessing altered database architecture 100, system users or programmers have created or modified existing database interface code 104. In such an embodiment, existing code 102 does not directly access altered database architecture 100. Instead, existing code 102 first accesses database interface code 104. Database interface code 104 then accesses altered database architecture 100. In prior art approaches, when database architecture 100 is changed, database interface code 104 may need to be changed to accommodate the new database architecture, existing code 102 may need to be changed, or both database interface code 104 and existing code 102 may need to be changed to accommodate the new database architecture. Furthermore, if database interface code 104 does not already exist, new database interface code must be created. Thus, the above-described prior art approach may require the modification or creation of database interface code before existing code can access an altered database architecture.

Thus, a need exists for a system and method which can readily access an altered database architecture using existing code. A further need exists for a system and method which does not require the creation or modification of database interface code to access an altered database architecture. Yet another need exists for a system and method which solves the above described needs without requiring analysis of existing code, without requiring modification of existing code, and without creating new code.

DISCLOSURE OF THE INVENTION

The present invention provides a computer system and method which can readily access an altered database architecture using existing code. The present invention further provides a system and method which does not require the creation or modification of database interface code to access an altered database architecture. The present invention also accomplishes the above described tasks without requiring analysis of existing code, without requiring modification of existing code, and without creating new code.

The present invention transforms information which is stored in a new format in a database. In one embodiment the information stored in the new format is transformed such that it appears to existing code to be stored in an old format. In so doing, existing code, which was originally designed to access the information stored in the old format, is able to access the information stored in the new format. Thus, the present invention allows a user to access information contained within an altered database architecture using existing code. As a result, the present invention eliminates the need to modify existing code each time a database architecture is changed.

More specifically, in one embodiment, the present computer-implemented invention generates a universal schema which corresponds to a database having information stored therein. In the present embodiment, the database architecture has been altered. That is, information previously stored in the database in an old format has been changed to a new format. The universal schema is provided with access to the information stored in the new format. Next, the universal schema is used to transform the information stored in the new format. The transformation causes the information stored in the new format to appear to existing code to be information stored in an old format. By using the universal schema, the information stored in the new format is then accessible to the existing code. Thus, the existing code can access the changed information without requiring any change or modification of the existing code. That is, the existing code which was originally intended to access the information in the old format is able, without modification, to access the information in the new format. Additionally, the present invention eliminates the need for modification or creation of any database interface code.

Other advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
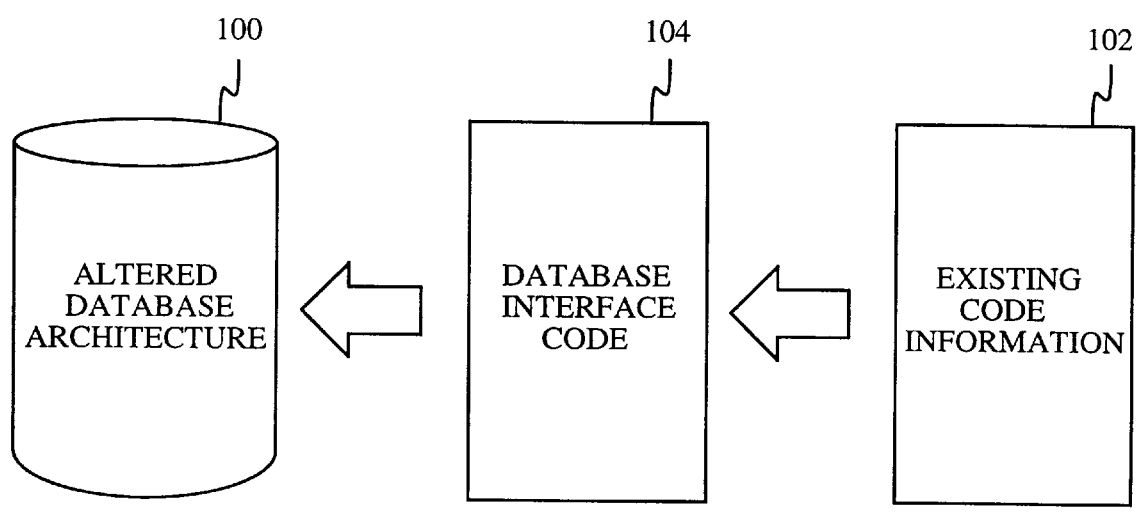
FIG. 1 is a schematic diagram of a prior art database access model.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "providing", "using", "accessing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

COMPUTER SYSTEM ENVIRONMENT OF THE PRESENT INVENTION

Figure 2:
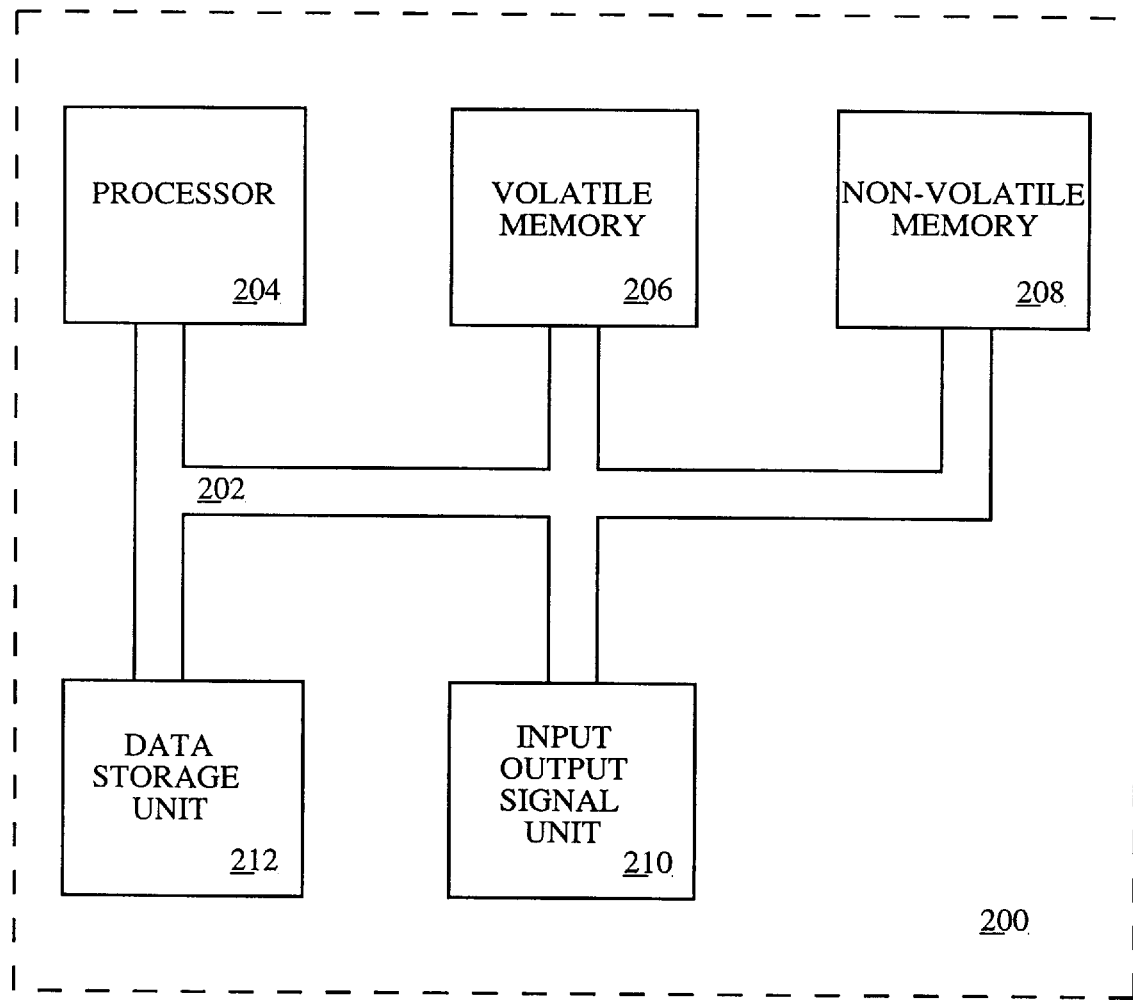
FIG. 2 is a logical representation of an exemplary computer system used as a part of a relational database management system (RDBMS) in accordance with the present invention.

With reference now to FIG. 2, portions of the present invention are comprised of computer executable instructions which reside in a computer system. FIG. 2 illustrates an exemplary computer system 200 used as a part of a relational database management system (RDBMS) in accordance with the present invention. RDBMS system 200 of FIG. 2 includes an address/data bus 202 for communicating information, a processor (or processors) 204 coupled to bus 202 for processing information and instructions. RDBMS system 200 also incudes data storage features such as computer readable volatile memory unit 206 (e.g., RAM memory), and a computer readable non-volatile memory unit 208 (e.g., ROM, EPROM, EEPROM, PROM, flash memory, programmed antifuses, etc.). Both volatile memory unit 206 and non-volatile memory unit 208 are coupled to bus 202. An optional input/output signal unit 210 and another computer readable data storage unit 212 (e.g., a high capacity magnetic and/or optical disk drive) are both coupled to bus 202. Input/output signal unit 210 allows bus 202 to communicate externally with other devices. Procedures of the present invention, described below, are implemented as program code stored within the above referenced computer readable memories and executed by processor 204.

Figure 3:
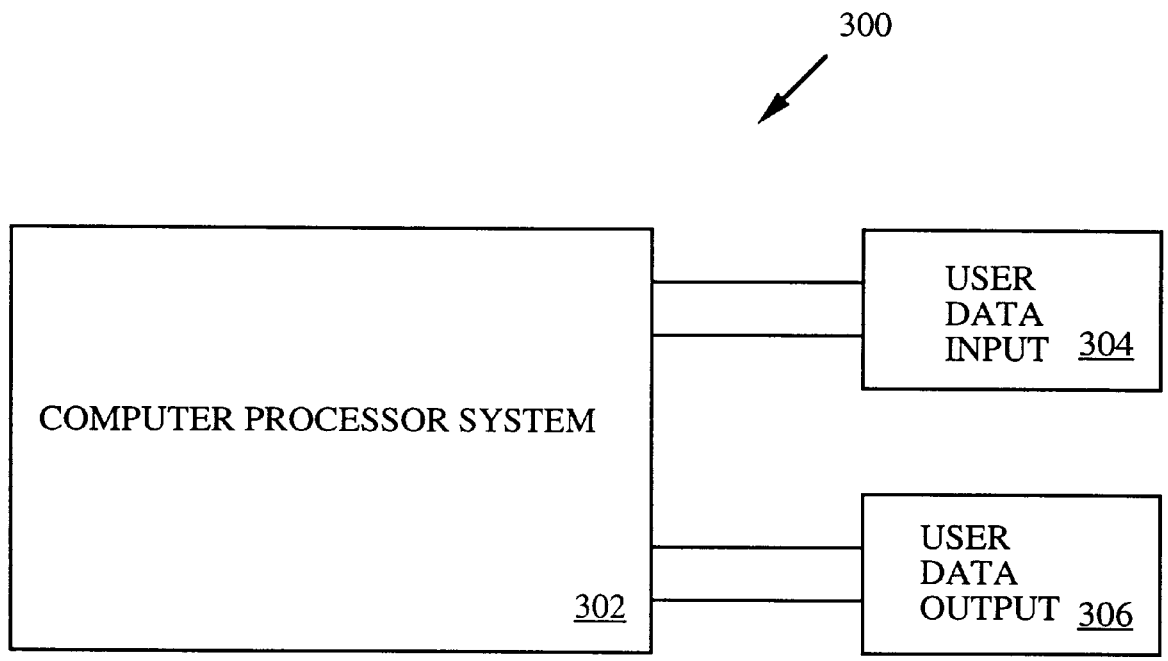
FIG. 3 is logical representation of an exemplary user computer system having a computer processor system coupled to specific user interface components in accordance with the present invention.

FIG. 3 illustrates an exemplary user computer system 300 having a computer processor system 302 coupled to specific user interface components. Specifically, a user data input device 304 is provided. User data input device 304 includes, for example, a keyboard, mouse, track pad, stylus and pad, trackball, and the like. The present exemplary user computer system 300 further comprises a user data output device 306 which includes, for example, a display device, printer, speaker, and the like for rendering information to a user. The display device can be a liquid crystal device, cathode ray tube, or other display device suitable for creating graphic images and alphanumeric characters recognizable to the user. A more detailed discussion of the present invention is found below.

GENERAL DESCRIPTION OF THE UNIVERSAL SCHEMA SYSTEM OF THE PRESENT INVENTION

Figure 4A:
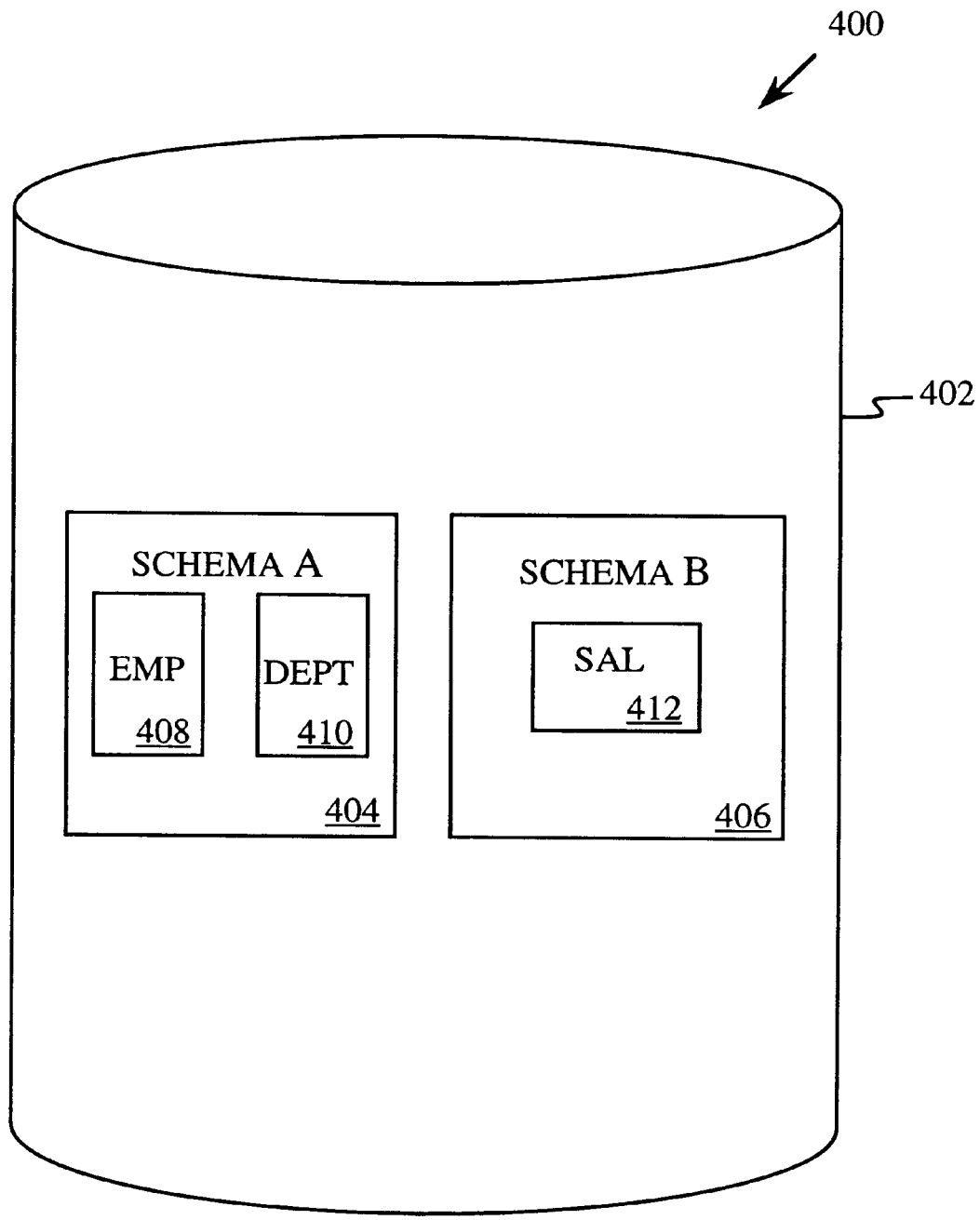
FIG. 4A is a schematic diagram illustrating a prior art database system.

With reference next to Prior Art FIG. 4A, a schematic diagram 400 illustrating a typical database system is shown. In FIG. 4A, a database 402 contains a plurality of schemas, schema A 404 and schema B 406. For purposes of the present application, a schema is a logical owner of an object and is intended to represent an entity within a database which owns an object, a role, or a privilege, or a set of objects, roles and/or privileges. As shown in FIG. 4A, schema A 404 contains data tables 408 and 410, while schema B 406 contains data table 412. In the present embodiment, EMP data table 408 contains employee information, DEPT data table 410 contains department information, and SAL data table 412 contains employee salary information. It will be understood that the present invention is well suited for use with various other types of data objects and information. That is, the present invention is well suited for use with data objects such as tables, clusters, and the like. Additionally, the present invention is also well suited for being used with information other than employee, department, or salary related information.

With reference still to FIG. 4A, code such as, for example, an instruction or set of instructions, is executed to access the information within database 402. For purposes of the present application, such instructions (or sets of instructions) are referred to as existing code. In the present embodiment, the existing code is executed in the schema which it is accessing. That is, if a portion of the existing code is accessing employee information, EMP 408, that portion of the existing code executes in the schema which owns the employee information. Hence, existing code accessing employee information executes in schema A 404. Likewise, existing code accessing department information executes in schema A 404. On the other hand, existing code accessing salary information executes in schema B 406. In the present embodiment, the existing code is written in Structured Query Language, however the present invention is well suited for use with existing code written in various other computer languages.

Figure 4B:
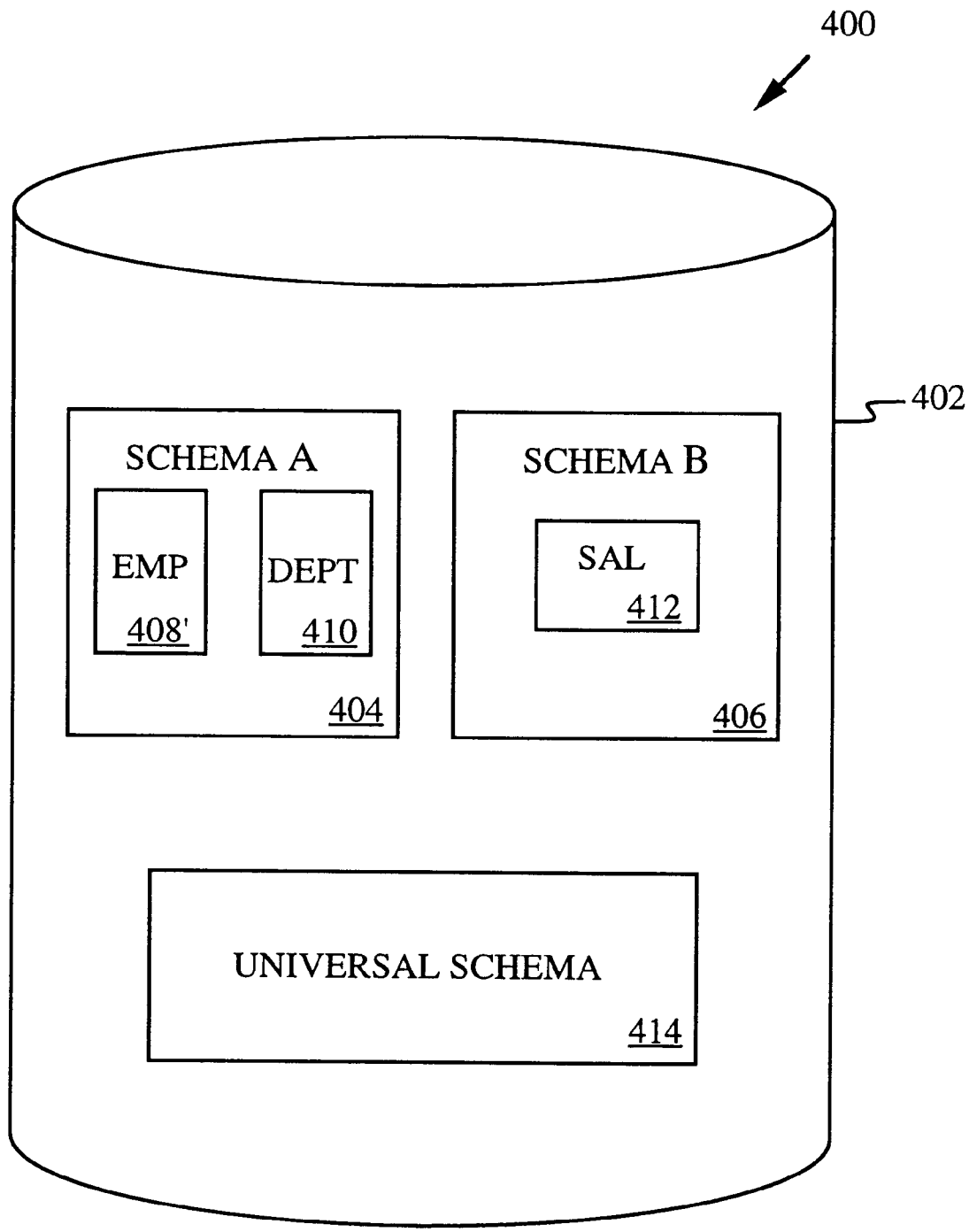
FIG. 4B is a schematic diagram illustrating a database system having an altered database architecture and a universal schema in accordance with the present invention.

FIG. 4B is a schematic diagram of the database system of FIG. 4A wherein the architecture of database 402 is altered. For purposes of the present application, a database architecture is considered altered if a change has been made to the format in which the information is stored. In the embodiment of FIG. 4B, the format in which employee information is stored has been changed. Thus, EMP data table 408 of FIG. 4A is now labeled EMP data table 408' in FIG. 4B. In the present embodiment, EMP data table 408' includes a column which was not previously present in EMP data table 408 of FIG. 4A. The added column indicates, for example, the social security number of each employee. In so doing, the format of the information is changed from an old format (no social security number column) to a new format (including a social security number column). It will be understood that the present invention is well suited to numerous other types of database format changes which may be necessary or desired. As mentioned above, in the prior art, existing code is written to access information having a specific format. If the existing code was intended to access data in the old format, the existing code will be unable to access information stored in a new format. Thus, in the prior art, the existing code is unable to access data in a database having an altered architecture.

With reference still to FIG. 4B, the present invention creates a universal schema 414 in altered database 402. In the present invention, universal schema 414 has access to the data objects in schema A 404 and schema B 406. Universal schema 414 is an automatically buildable schema which isolates the existing code from the changes made to database 402. In the present invention, universal schema 414 transforms the information from the new format to the old format. Moreover, when information is desired, the existing code accesses universal schema 414 instead of schema A 404 or schema B 406. As a result, the existing code is executed in universal schema 414 instead of schema A 404 or schema B 406. Because universal schema transforms the information from the new format to the old format, the existing code can then be used to access the desired information. Furthermore, the present invention allows the existing code to access the altered database architecture without requiring any change or modification to the existing code. That is, the existing code which was originally intended to access the information in the old format is able, without modification, to access the information in the new format.

Figure 4C:
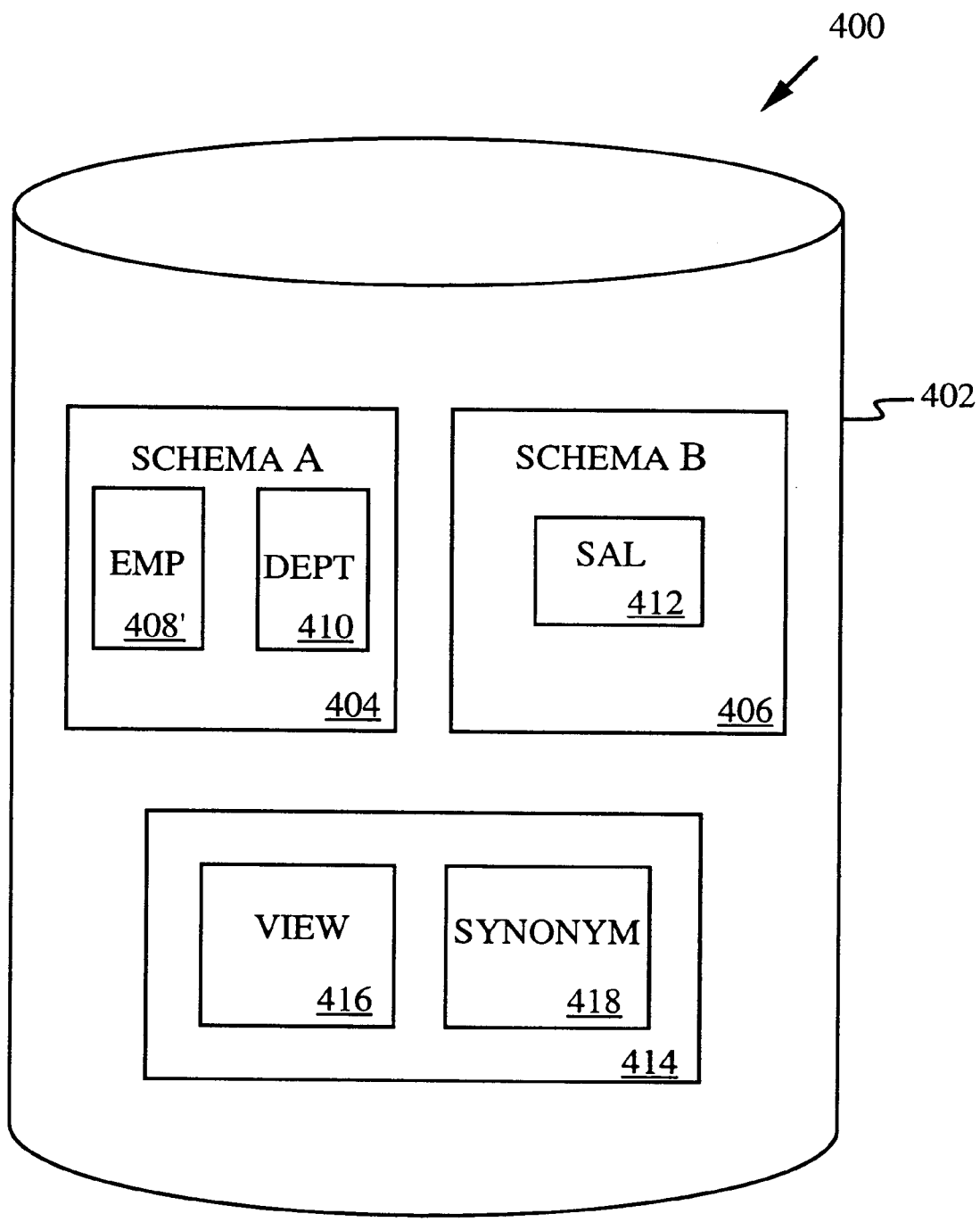
FIG. 4C is a schematic diagram illustrating a database system having an altered database architecture and a universal schema containing views and synonyms in accordance with the present invention.

Referring next to FIG. 4C, a schematic diagram illustrating a database system having an altered database architecture is shown. The embodiment of FIG. 4C further includes a universal schema containing a view 416 and a synonym 418 therein. Although both a view 416 and a synonym 418 are shown in the embodiment of FIG. 4C, the present invention is also well suited to having only a view or only a synonym present in universal schema 414. Likewise, the present invention is also well suited to having multiple views and/or multiple synonyms present in universal schema 414.

The present invention further creates privileges so that the view or synonym in the universal schema has access to all referenced objects. In the present invention, view 416 is used to transform the information from the new format to the old format. More specifically, view 416 is created by an instruction or set of instructions such as, for example, a Structured Query Language command which generates a different representation of the changed information. In the present embodiment, the changed employee information having a social security number column is represented by view 416 to appear to be employee information in the old format (no social security column). Thus, view 416 of universal schema 414 transforms the information such that the existing code can access desired information without requiring any modification or rewriting of the existing code. Additionally, no change to the database interface code is required.

Figure 4D:
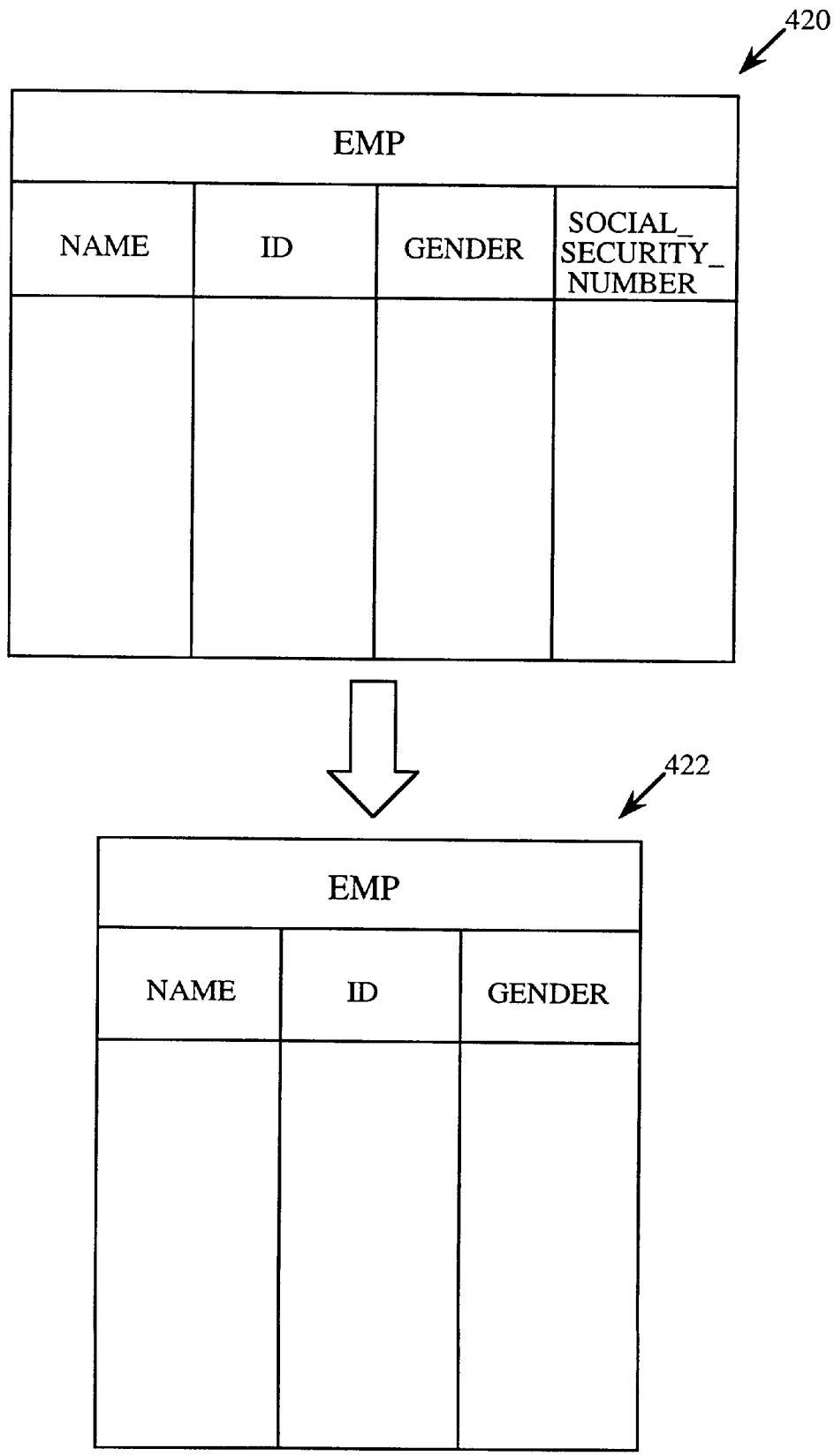
FIG. 4D is a schematic diagram illustrating information changed in accordance with the present invention.

With reference now to FIG. 4D, a schematic diagram illustrating information changed in accordance with the present invention is shown. In FIG. 4D, a data table containing employee information, EMP data table 420, is comprised of 4 columns. Specifically, EMP data table 420 includes an employee name column, EMP. NAME, an employee identifier column, EMP. ID, an employee gender column, EMP. GENDER, and an employee social security number column, EMP. SOCIAL_SECURITY_NUMBER. In the present embodiment, the EMP. SOCIAL_SECURITY_NUMBER column is a new addition to EMP data table 420. Furthermore, the existing code was originally written with the intention of accessing a three column EMP data table. Hence, the existing code is unable to access data in the altered architecture of EMP data table 420. In the present embodiment, a view is used to transform the information from the new format (including SOCIAL_SECURITY_NUMBER column) to the old format (excluding SOCIAL_SECURITY_NUMBER column). More specifically, a view 422 of EMP datable 420 is created by an instruction such as, for example, a Structured Query Language (SQL) command which generates a different representation of the changed information. In the present embodiment, the SQL command is:

select EMP.NAME, EMP.ID, EMP.GENDER from EMP

As a result of the SQL command, EMP data table 420 having a social security number column is represented by view 422 to appear to be employee information in the old format (no social security column). Thus, view 422 transforms EMP data table 420 such that the existing code can access desired information without requiring any modification or rewriting of the existing code.

Referring again to FIG. 4C, the present embodiment further includes a synonym 418 for transforming the information from the new format to the old format. Unlike view 416, synonym 418 does not generate a different representation of the changed information. Instead, synonym 418 generates an alias of information existing outside of universal schema 414. The synonym allows the existing code to then access the changed information without any changes or modifications of the existing code. As an example, assume the name of EMP data table 408 had been changed to EMPLOYEE_INFO data table. When the existing code attempted to access employee information the existing code would not be able to locate or access EMP data table. However, the present invention creates a synonym of EMPLOYEE_INFO data table in universal schema 414. Specifically, the synonym to EMPLOYEE_INFO data table would be entitled EMP data table. Thus, when the existing code accesses universal schema 414, the existing code would, in fact, locate and access the alias entitled EMP data table which resolves to the new data table entitled EMPLOYEE_INFO. The synonym allows existing code to access the information stored in the new format (i.e. the newly titled data table). Thus, synonym 418 of universal schema 414 transforms changed information such that the existing code can access desired information without requiring any modification or rewriting of the existing code. Additionally, the present invention does not require changing of database interface code if present.

Figure 5:
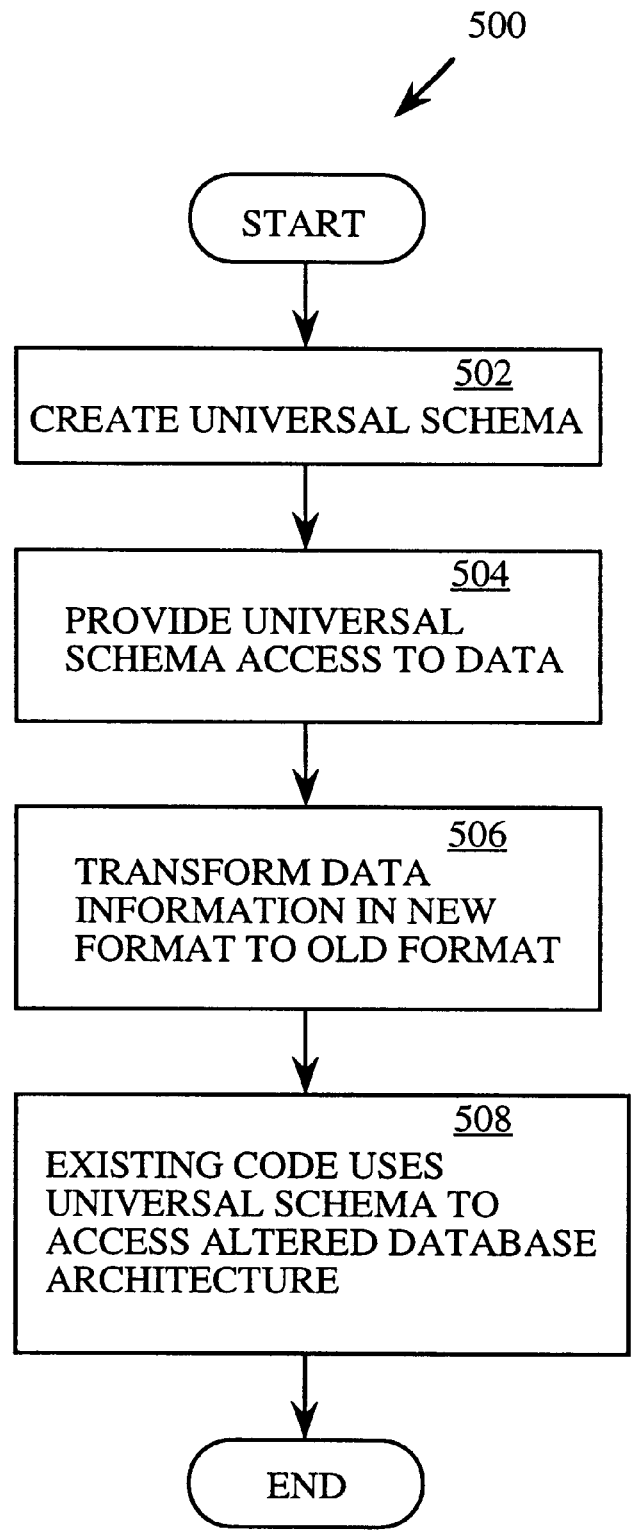
FIG. 5 is a flow chart illustrating steps performed in accordance with the present claimed invention.

With reference next to FIG. 5, a flow chart illustrating steps performed in accordance with the present claimed invention is shown. In step 502, the present invention creates an empty universal schema.

In step 504 of FIG. 5, the present invention provides the universal schema with access to information in necessary schemas. Specifically, the present invention automatically creates grants from information in the other schemas to the universal schema.

In step 506, the present invention creates views and/or synonyms which transform the information from the new (altered) format to the old format.

In step 508 of FIG. 5, existing code uses the universal schema to access altered information. In so doing, the present invention transforms changed information such that the existing code can access desired information without requiring any modification or rewriting of the existing code. Again, no change to any database interface code is required by the present invention.

SPECIFIC IMPLEMENTATION OF PRESENT INVENTION

A specific implementation of the present invention is described below. Although such a specific implementation is described below, it will be understood that the present invention is well suited to numerous other implementations. In some relational database systems, a product install group is used to describe an installation of one or more application products. The application products may include, for example, an inventory application product for controlling inventory of goods, a general ledger application product for accounting purposes, and the like, in a logical group. Typically, a product install group would contain several application products. In the prior art, in general each application product has its own schema. That is, an inventory application product has an inventory schema, a general ledger application has a general ledger schema, and so on. Each of the schemas may contain tables, indices, sequences, packages, views, procedures, functions, and triggers corresponding to the application product represented thereby.

Figure 6:
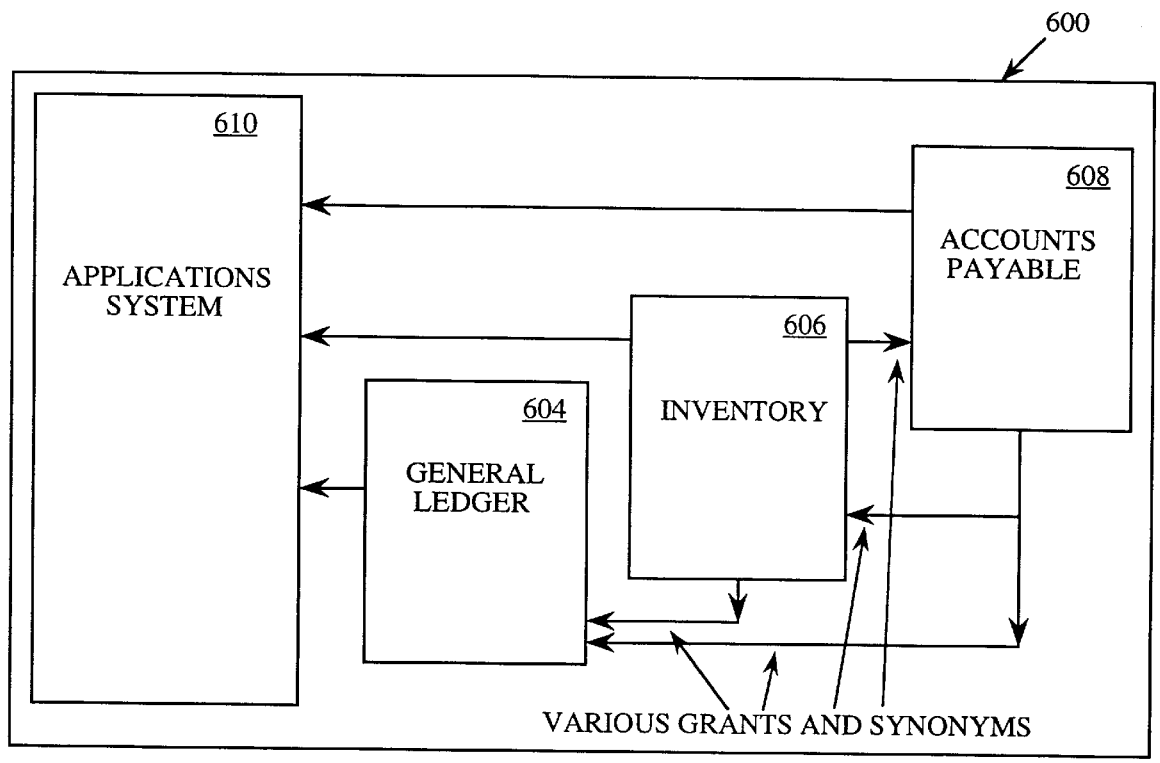
FIG. 6 is a schematic diagram of prior art illustrating several application products of single product install group.

With reference to prior art FIG. 6, a schematic diagram 600 illustrating several application products of a single product install group is shown. To use such prior art systems, a user would establish a connection directly to the application product which the user desired. However, prior art schema architectures make it extremely difficult to share code objects such as views, packages, procedures, functions, and triggers. That is, because code objects in one application product often access items in other application products, developers must ensure that database objects in each application product have appropriate access to all needed objects residing in other application products. For example, a user connected to the inventory schema 606 may need access to objects in a general ledger schema 604 or in the accounts payable schema 608. For the user's function to work properly, inventory schema 606 must have the appropriate grants and synonyms on the general ledger objects and the accounts payable objects that are referenced by the function. Thus, when multiple application schemas containing numerous different database objects access many other application schemas' objects, keeping track of all the proper dependencies is difficult and error prone. Additionally, granting access to all objects in other schemas can create performance, maintenance, and sizing problems.

Figure 7:
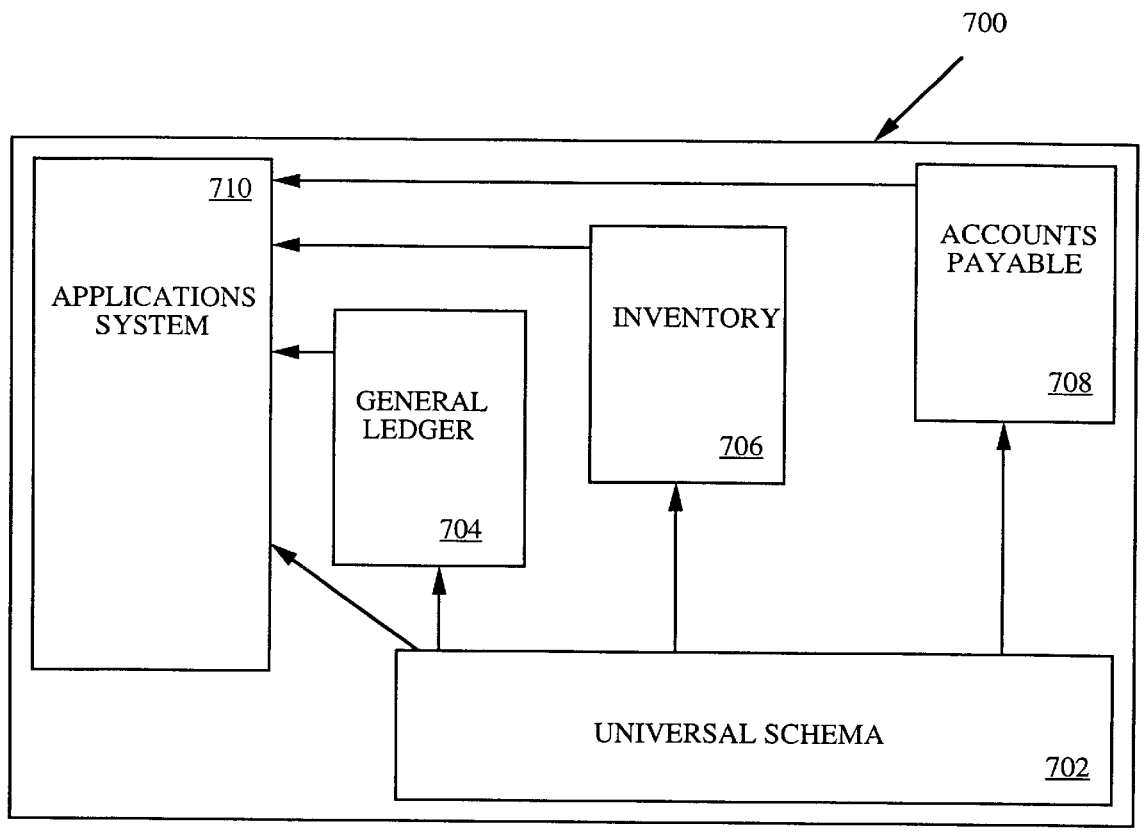
FIG. 7 is a schematic diagram illustrating a universal schema in accordance with the present claimed invention.

With reference next to FIG. 7, a schematic diagram 700 of a universal schema used in accordance with the present claimed invention is shown. In the present embodiment, a universal schema 702 is created. The embodiment includes a general ledger application product schema 704, an inventory application product schema 706, an accounts payable application product schema 708, and an application systems schema 710. Universal schema 702 is coupled to each of the application schemas 704, 706, 707, 708, and 710. The universal schema 702 allows a user to access all application products related to the current product install group by connecting to universal schema 702. That is, a single universal schema is coupled to its respective application product schemas. The present invention is also well suited to having multiple universal schemas coupled to different product install groups or application product schemas.

Figure 8:
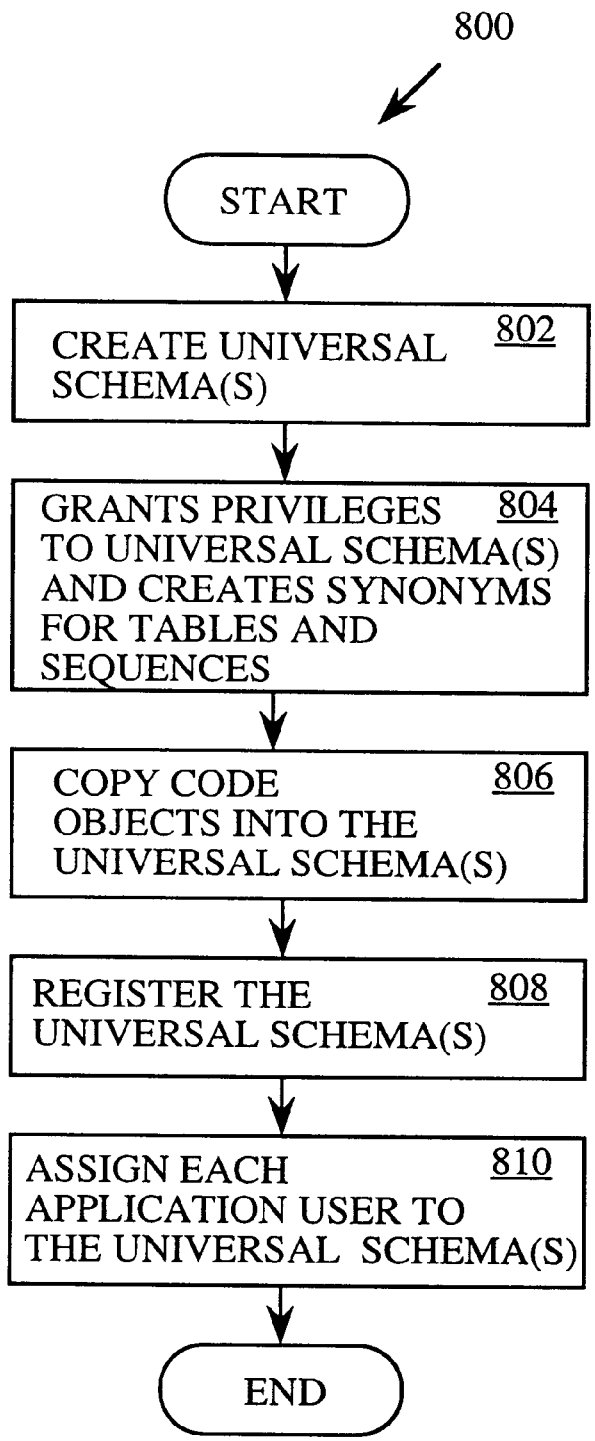
FIG. 8 is a flow chart illustrating steps performed in accordance with a specific implementation of the present claimed invention.

With reference next to FIG. 8, a flow chart 800 illustrating steps performed by the present invention is shown. In step 802, the present invention creates a universal schema and names it. In the present embodiment, the universal schema is named "APPS." The present invention is well suited to naming the universal schema other than APPS. Furthermore, when multiple universal schemas are created in the same database, each universal schema is named uniquely.

In step 804 of FIG. 8, the present invention creates grants from each base schema data object in an applications product schema (or schemas) to the appropriate universal schema and creates a synonym in the universal schema to the object in the related base schema.

Next, the present invention "copies" code objects from the application product schemas into the appropriate universal schema. Specifically, the present invention runs scripts which copy views, packages, functions, procedures, and triggers from all the application product schemas to the appropriate universal schema.

Referring still to steps 804 and 806 of FIG. 8, in one embodiment, the present invention runs scripts in the following order. An exemplary list of scripts run by the present invention follows:

1.) adappsgs.pls (Creates grants for and synonyms in each universal schema)
2.) adappssv.pls (Creates Multiple Organization support views. A discussion of the present invention in a Multiple Organization environment follows)
3.) adappsvw.pls (Copies product views to the universal schema)
4.) adappsos.pls (Creates non-standard synonyms)
5.) adappsps.pls (Copies package specifications to the universal schema)
6.) adappspb.pls (Copies packages, functions, and procedure bodies to the universal schema)
7.) adappsca.pls (Compiles packages, functions and procedures in the universal schema)
8.) adappsct.pls (Copies triggers to the universal schema, then deletes the copied triggers from the application product schema)

With reference still to step 806 of FIG. 8, each of the above-listed "adapps . . . " scripts takes 9 arguments. These arguments are:

| Number | Argument | Type | What It Means |
|---|---|---|---|
| 1 | SYSTEM password | VARCHAR2 | The password to the SYSTEM schema |
| 2 | install_group_num | NUMBER | The product install group number of the universal schema |
| 3 | from_schema | VARCHAR2 | The base product schema being copied from |
| 4 | aol_schema | VARCHAR2 | The name of the applications system schema |
| 5 | apps_schema | VARCHAR2 | The name of the universal schema being copied to |
| 6 | is_multiorg_flag | BOOLEAN TEXT | TRUE if this installation uses a multiple organization architecture |
| 7 | is_multilingual_flag | BOOLEAN TEXT | TRUE if this installation uses a multilingual architecture |
| 8 | first_install_group_flag | BOOLEAN TEXT | TRUE if this is the first universal schema |
| 9 | subset | VARCHAR2 | The abbreviation of the product in from_schema. |

It will be understood that the above listed scripts and arguments are exemplary only, and that the present invention is well suited to using other types of scripts, arguments, or other program languages.

As shown in step 808 of FIG. 8, the present embodiment then registers all of the application schemas. The present embodiment creates a user identification table which describes which application products and application schemas exist. Additionally, each universal schema is included in the user identification table.

Referring next to step 810 of FIG. 8, the present embodiment associates each application user to the appropriate universal schema. This makes the application products run from a schema with appropriate access and configuration.

Although such application products or schemas are specified in the present embodiment, the present invention is also well suited for use with a product install group having fewer or greater application products and with various other application products. Additionally, the present invention is also well suited to having two or more universal schemas corresponding to respectively two or more related sets of application product schemas or product install groups.

Thus, the present embodiment allows a user to access multiple application products, by connecting to the respective universal schema. The present embodiment improves install, upgrade and patching reliability by eliminating the need for cross product grants and synonyms and allows for significantly easier creation and modification of code objects like packages, views, and triggers. Additionally, the present embodiment sets up each universal schema automatically. Finally, the present embodiment does not require changing any of the existing code.

SPECIFIC IMPLEMENTATION OF PRESENT INVENTION IN A MULTIPLE ORGANIZATION ENVIRONMENT

Figure 9:
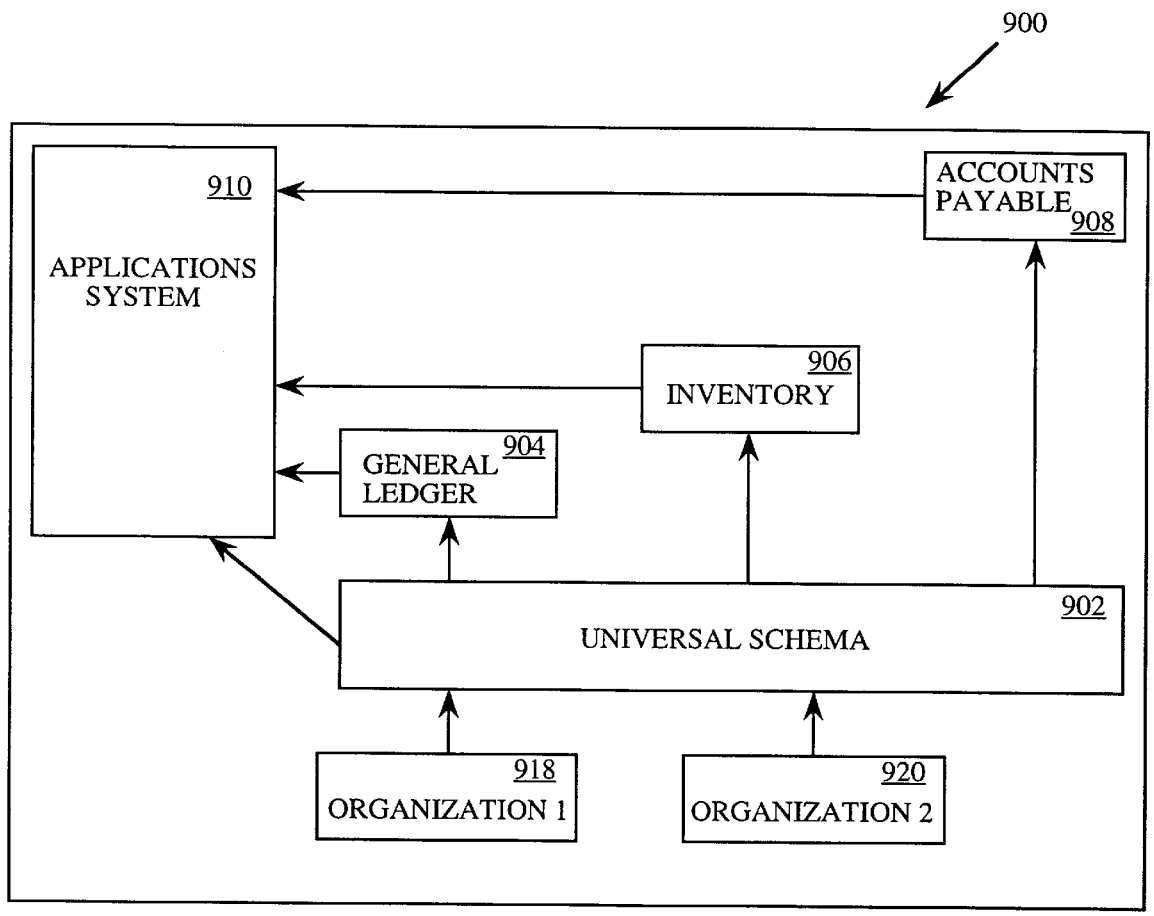
FIG. 9 is a schematic diagram of a universal schema used in a multiple organization environment in accordance with the present claimed invention.

With reference now to FIG. 9, a schematic diagram 900 illustrating yet another embodiment of the present invention is shown corresponding to a multiple organization environment. In the present invention, a single universal schema 902 is created. The present embodiment includes a general ledger application product schema 904, an inventory application product schema 906, an accounts payable application product schema 908, and an applications systems schema 910. The present embodiment further includes two organization schemas 918 and 920. Universal schema 902 is coupled to each of the application products 904, 906, 907, 908, and 910. Likewise, organization1 918 and organization2 920 are coupled to universal schema 902. In the present embodiment, unlike prior embodiments, the user connects directly to a specific organization schema, not to the universal schema. Although such application products or schemas are specified in the present embodiment, the present invention is also well suited for use with a product install group having fewer or greater application products and with various other application products. The present invention is also well suited to having fewer or greater organization schemas. The present invention is also well suited to supporting organization functionality directly within the universal schema. In such an embodiment, the present invention does not require separate organization schemas, but instead provides the functionality of the separate organization schemas within the universal schema.

In a multiple organization environment, multiple separate business units share an applications product install group. For example, multiple subsidiaries of a corporation would share a common general ledger application, and a common accounts payable application and so on. In the prior art, multiple separate data structures were used to store information for respective subsidiaries. When the database architecture is altered such that, for example, accounts payable information for multiple subsidiaries is stored in a single data structure, existing code is no longer functional. More specifically, existing code is unable to differentiate between information belonging to one subsidiary and information belonging to another subsidiary. The present embodiment eliminates the problems associated with prior art application systems.

Figure 10:
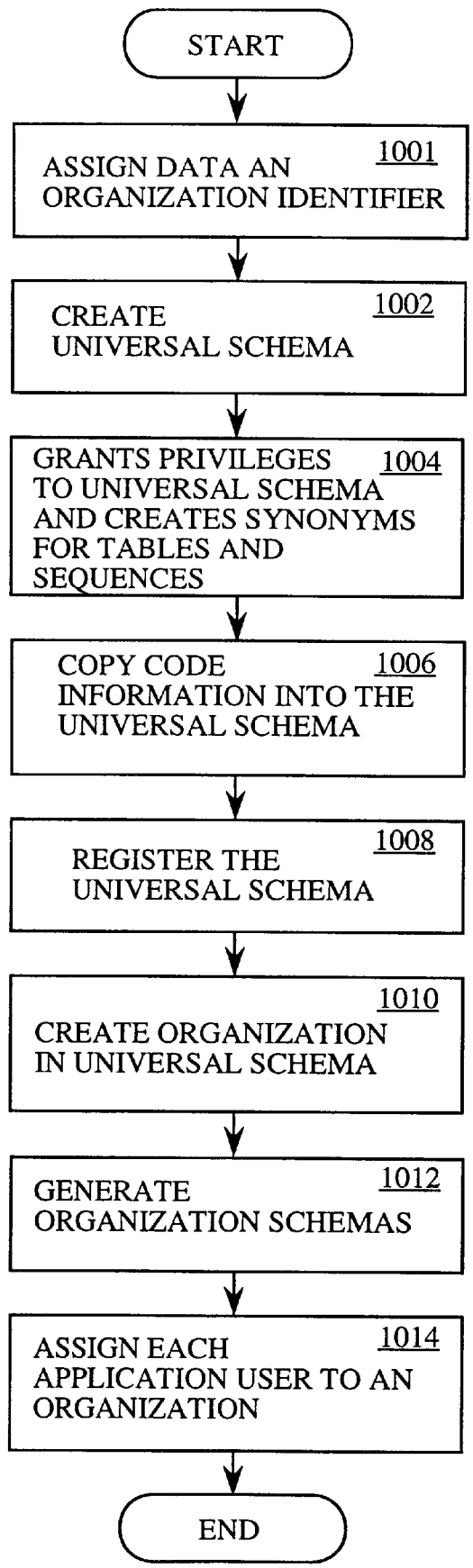
FIG. 10 is a flow chart illustrating steps performed in accordance with a multiple organization embodiment of the present claimed invention.

With reference next to FIG. 10, a flow chart illustrating steps performed in accordance with the present multiple organization embodiment is shown. As shown in step 1001, the present embodiment assigns an organization identifier to data in each application product. The present embodiment accomplishes this task by adding an organization identifier column to the single data structure. Additionally, the present embodiment defines a database default value for the column such that newly inserted data are identified with the proper organization. In so doing, the present embodiment logically partitions the data in the single data structure according to the organization to which the information belongs. As a result, the present embodiment insures that all information stored in a common data structure has an organization identifier associated therewith.

In step 1002 the present invention creates and names the single universal schema as described in detail in a previous embodiment.

In step 1004 of FIG. 10, the present invention creates grants from each base schema data object in an applications product schema (or schemas) to the universal schema and creates a synonym in the universal schema to the object in the related base schema.

In step 1006, the present invention "copies" objects from the application products of the single product install group into the universal schema. As mentioned above, the present invention runs scripts which copy views, packages, functions, procedures, and triggers from all the application products to the universal schema.

As shown in step 1008 of FIG. 10, the present embodiment then registers the universal schema. The present embodiment creates a user identification table which describes which application products and application schemas currently exist. The universal schema is included in the user identification table.

With reference still to FIG. 10, in step 1010, the present embodiment then creates organization views in the universal schema 902 of FIG. 9. Each of the views sees only information having a particular organization identifier associated therewith. That is, a view will only see that row or set of rows in the single data structure which has a respective specific organization identifier assigned thereto. Therefore, the present invention provides "row-level" data partitioning. Thus, the present invention provides a level of security using a single data structure, that was previously only available using multiple data structures. In the present embodiment, the view is given the same name as the single data structure. For example, a view which is intended to access data for an accounts payable application product will be given the same name as the single data structure which holds the accounts payable information. However, the view will only see accounts payable information having a specific organization identifier associated therewith. Therefore, the present embodiment's use of views partitions data as effectively as using separate data structures. Additionally, the present embodiment achieves the logical partitioning of data without changing existing code.

In step 1012 of FIG. 10, the present embodiment generates at least one organization schema. Two organization schemas 918 and 920 are created in the embodiment of FIG. 9. Each of 918 and 920 has respective context information associated therewith and is coupled to universal schema 902. The context information of 918 and 920 defines which data the views in the universal schema can access. In so doing, the present invention limits which information is accessed by each of 918 and 920. For example, 918 may only see information pertaining to a Canadian subsidiary, while 920 may be defined to see only information pertaining to a Mexican subsidiary.

The context information of 918 and 920 further determines which organization identifier is assigned to information stored in the single data structure by either 918 or 920. The present embodiment utilizes a database default value mechanism to accomplish this. Specifically, if 918, pertaining to a Canadian subsidiary, stores data in the single data structure, the stored information will have an organization identifier associated therewith. The organization identifier will indicate that the data came from 918 and thus pertains to the Canadian subsidiary. The present embodiment provides functionality which can extend across several organizations. Furthermore, the present embodiment provides cross-product functionality. The present embodiment makes it possible to access, for example, all of the inventory information across all organizations. As a result, the present embodiment facilitates cross-organizational reporting. In so doing, a user can determine, for example, the cumulative inventory available not just that for a particular organization. Additionally, the present embodiment provides such functionality without requiring that the user create custom schemas for this purpose.

In step 1014, the present embodiment points each application user to the appropriate organization such that the application products run from the appropriate schema.

All of the functional advantages provided by the present embodiment are achieved without changing underlying existing application code objects. Instead, the present embodiment logically partitions information using views to accommodate existing code. Thus, the views used in the present embodiment isolate the code from the data in the single data structure.

Thus, the present invention provides a system and method which efficiently shares code and data objects between different application products, and a system and method which logically partitions a single data structure such that multiple organizations can access selected portions of information contained within the single data structure. The present invention accomplishes the above tasks without changing existing code and does so in an automatable fashion.

More generally, the present invention provides a computer system and method which can readily access an altered database architecture using existing code. The present invention further provides a system and method which does not require the creation or modification of database interface code to access an altered database architecture. The present invention also accomplishes the above described tasks without requiring analysis of existing code, without requiring modification of existing code, and without creating new code.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. In a computer system, a method of accessing altered information using existing code, wherein said altered information was originally stored in an old format and has been changed to a new format, said method comprising computer implemented steps of:

generating a universal schema corresponding to a database having information stored therein, said information stored in a new format;

providing said universal schema with access to said information stored in said new format;

using said universal schema to transform said information stored in said new format such that said information stored in said new format appears to existing code to be information stored in an old format; and accessing said information stored in said new format via said universal schema, said universal schema accessed using said existing code such that said information stored in said new format can be accessed without changing said existing code.

2. The method of accessing altered information using existing code as recited in claim 1 wherein said step of transforming information stored in said new format comprises the step of:

creating in said universal schema an alias of said information stored in said new format.

3. The method of accessing altered information using existing code as recited in claim 2 wherein said step of creating in said universal schema an alias of said information stored in said new format comprises the step of:

creating a synonym for said information stored in said new format, said synonym created in said universal schema.

4. The method of accessing altered information using existing code as recited in claim 1 wherein said step of using said universal schema to transform said information stored in said new format comprises the step of:

creating a view of said information stored in said new format, said view created in said universal schema.

5. The method of accessing altered information using existing code as recited in claim 1 wherein said step of accessing said information stored in said new format via said universal schema comprises the step of:

accessing said universal schema using existing Structured Query Language instructions.

6. A computer system comprising:

a processor;

an address/data bus coupled to said processor;

a computer readable memory coupled to communicate with said processor, said processor for performing steps of:

generating a universal schema, said universal schema corresponding to a database having information stored therein, wherein said information was originally stored in an old format and has been changed to a new format, said information stored in said new format;

providing said universal schema with access to said information stored in said new format;

using said universal schema to transform said information stored in said new format such that said information stored in said new format appears to existing code to be information stored in said old format; and accessing said information stored in said new format via said universal schema, said universal schema accessed using said existing code such that said information stored in said new format can be accessed without changing said existing code.

7. The computer system as recited in claim 6 wherein said step of transforming information stored in said new format comprises the step of:

creating in said universal schema an alias of said information stored in said new format.

8. The computer system as recited in claim 7 wherein said step of creating in said universal schema an alias of said information stored in said new format comprises the step of:

creating a synonym for said information stored in said new format, said synonym created in said universal schema.

9. The computer system as recited in claim 6 wherein said step of using said universal schema to transform said information stored in said new format comprises the step of:

creating a view of said information stored in said new format, said view created in said universal schema.

10. The computer system as recited in claim 6 wherein said step of accessing said information stored in said new format via said universal schema comprises the step of:

accessing said universal schema using existing Structured Query Language instructions.

11. A computer-usable medium having computer-readable program code embodied therein for causing a computer to perform steps of:

generating a universal schema corresponding to a database having information stored therein, wherein said information was originally stored in an old format and has been changed to a new format, said information stored in said new format;

providing said universal schema with access to said information stored in said new format;

using said universal schema to transform said information stored in said new format such that said information stored in said new format appears to existing code to be information stored in said old format; and accessing said information stored in said new format via said universal schema, said universal schema accessed using said existing code such that said information stored in said new format can be accessed without changing said existing code.

12. The computer-usable medium having computer-readable program code embodied therein as recited in claim 11 wherein said computer-readable program code embodied therein for causing a computer to perform the step of transforming information stored in said new format causes a computer to perform the step of:

creating in said universal schema an alias of said information stored in said new format.

13. The computer-usable medium having computer-readable program code embodied therein as recited in claim 12 wherein said computer-readable program code embodied therein for causing a computer to perform the step of creating in said universal schema an alias of said information stored in said new format causes a computer to perform the step of:

creating a synonym for said information stored in said new format, said synonym created in said universal schema.

14. The computer-usable medium having computer-readable program code embodied therein as recited in claim 11 wherein said computer-readable program code embodied therein for causing a computer to perform the step of using said universal schema to transform said information stored in said new format causes a computer to perform the step of:

creating a view of said information stored in said new format, said view created in said universal schema.

15. The computer-usable medium having computer-readable program code embodied therein as recited in claim 11 wherein said computer-readable program code embodied therein for causing a computer to perform the step of accessing said information stored in said new format via said universal schema causes a computer to perform the step of:

accessing said universal schema using existing Structured Query Language instructions.

* * * * *